US008880598B2

(12) United States Patent
Sekaran et al.

(10) Patent No.: US 8,880,598 B2
(45) Date of Patent: Nov. 4, 2014

(54) EMULATION OF ROOM LOCK AND LOBBY FEATURE IN DISTRIBUTED CONFERENCING SYSTEM

(75) Inventors: Dhigha D. Sekaran, Redmond, WA (US); Kenneth Wolfe, Redmond, WA (US); Doug Wyatt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 11/784,922

(22) Filed: Apr. 10, 2007

(65) Prior Publication Data

US 2008/0256182 A1 Oct. 16, 2008

(51) Int. Cl.
 *G06F 15/16* (2006.01)
 *G06Q 10/10* (2012.01)
 *H04L 12/18* (2006.01)
(52) U.S. Cl.
 CPC ............ *H04L 12/1822* (2013.01); *G06Q 10/10* (2013.01)
 USPC ......................................................... 709/204
(58) Field of Classification Search
 CPC ... G06Q 10/10; G06F 21/604; H04L 12/1822
 USPC ......................................................... 709/204
 See application file for complete search history.

(56) References Cited

U.S. PATENT DOCUMENTS

| 6,195,687 | B1 | 2/2001 | Greaves et al. |
| 6,563,914 | B2 | 5/2003 | Sammon et al. |
| 6,608,636 | B1 | 8/2003 | Roseman |

(Continued)

FOREIGN PATENT DOCUMENTS

| CN | 101218578 A | 7/2008 |
| EP | 0717546 A2 | 6/1996 |

(Continued)

OTHER PUBLICATIONS

Bisdikian, et al., "MultiMedia Digital Conferencing: A Web-enabled multimedia teleconferencing system", Date: 1998, vol. 42, No. 2, http://www.research.ibm.com/journal/rd/422/bisdikian.html.
Lin, et al., "Implementation of H.323 compliant Virtual Meeting Systems", http://www.cs.ccu.edu.tw/~cwlin/pub/icsvmeeting.pdf.
Nijholt, et al., "The Distributed Virtual Meeting Room Exercise", Date: Oct. 2005, http://www.idiap.ch/ICMI05/pdf/MMMP_paper21.pdf.

(Continued)

*Primary Examiner* — Krista Zele
*Assistant Examiner* — James Forman
(74) *Attorney, Agent, or Firm* — Andrew Smith; Jim Ross; Micky Minhas

(57) ABSTRACT

Architecture for a session lock and lobby feature in a distributed conferencing framework for a conferencing session. Under a lock scenario, once a user enters the session, the session can be locked to prevent other individuals from entering, even if the individuals were invited to the session. Locking can be accomplished manually by a session participant and/or automatically based on criteria. The lobby feature allows a session participant to be aware of users in the lobby and pending access to the session by providing notification and/or identification of the user attempting to gain access. The session leader can selectively allow access to the session. The architecture facilitates lock and lobby features in multiple identical, leaderless, conference servers which together form a distributed conferencing system. The lock and lobby features can employ media session protocols such as session initiation protocol (SIP) and centralized conference control protocol (C3P).

19 Claims, 7 Drawing Sheets

(56) References Cited

U.S. PATENT DOCUMENTS

| | | | |
|---|---|---|---|
| 6,976,220 | B1 | 12/2005 | Lapstun et al. |
| 7,130,883 | B2 | 10/2006 | Zhu et al. |
| 7,398,295 | B2* | 7/2008 | Shoroff et al. ............. 709/204 |
| 2002/0156848 | A1* | 10/2002 | Grouse ...................... 709/204 |
| 2003/0100325 | A1 | 5/2003 | Paila et al. |
| 2004/0015549 | A1* | 1/2004 | Saruhashi et al. ........... 709/204 |
| 2004/0125933 | A1* | 7/2004 | Jun et al. ................ 379/202.01 |
| 2004/0199580 | A1 | 10/2004 | Zhakov et al. |
| 2004/0267938 | A1* | 12/2004 | Shoroff et al. ............. 709/227 |
| 2005/0058088 | A1 | 3/2005 | Decker et al. |
| 2005/0193129 | A1 | 9/2005 | Barlow |
| 2006/0083244 | A1 | 4/2006 | Jagadesan et al. |
| 2006/0104259 | A1* | 5/2006 | Caballero-McCann et al. .......................... 370/352 |
| 2006/0182249 | A1* | 8/2006 | Archambault et al. .. 379/202.01 |
| 2006/0239212 | A1 | 10/2006 | Pirzada et al. |
| 2007/0011233 | A1* | 1/2007 | Manion et al. ............. 709/204 |
| 2007/0050452 | A1* | 3/2007 | Raju ........................... 709/204 |
| 2007/0067387 | A1* | 3/2007 | Jain et al. ................... 709/204 |
| 2007/0100940 | A1* | 5/2007 | Eriksson ..................... 709/204 |
| 2007/0208806 | A1* | 9/2007 | Mordecai et al. .......... 709/204 |
| 2007/0233291 | A1* | 10/2007 | Herde et al. ................. 700/91 |

FOREIGN PATENT DOCUMENTS

| | | |
|---|---|---|
| JP | 11250278 | 9/1999 |
| JP | 2000187631 | 7/2000 |
| JP | 2002140278 | 5/2002 |
| JP | 2005296419 | 10/2005 |
| JP | 2006172430 | 6/2006 |
| KR | 10-2006-0088138 | 8/2006 |
| WO | WO 0217664 | 2/2002 |

OTHER PUBLICATIONS

Shih, et al., "The Design and Implementation of a Virtual Conference System", Date: 2000, http://ieeexplore.ieee.org/iel5/7100/19131/00884728.pdf?isNumber=.

International Search Report for PCT/US2008/058960, Mailed on Jul. 29, 2008, 2 pages.

Chinese Notice on the First Office Action mailed Mar. 11, 2011, in People's Republic of China Patent Application No. 200880011472.X (11 pages).

Chinese Decision on Rejection mailed Jan. 29, 2012, in Chinese Application No. 200880011472.X (12 pages).

Japanese Notice of Rejection mailed on Mar. 23, 2012, in Japanese Patent Application No. 2010-503121 (6 pages).

Japanese Notice of Final Rejection mailed on Oct. 5, 2012, in Japanese Patent Application No. 2010-503121 (6 pages).

Russian Decision on Grant mailed on Jun. 15, 2012, in Russian Patent Application No. 2009137597 (25 pages).

Chinese Notice on the Second Office Action mailed Dec. 3, 2013, in People's Republic of China Patent Application No. 200880011472.X (14 pages).

Japanese Notice of Allowance in Application 2010-503121, mailed Jun. 21, 2013, 6 pgs.

European Extended Search Report in European Application 08744821.3, mailed Mar. 27, 2013, 9 pgs.

Final Office Action Received in China Application No. 200880011472.X, Mailed Date: Mar. 19, 2014, Filed Date: Mar. 31, 2008, 10 Pages.

Notice of Preliminary Rejection in Korean Application No. KR10-2009-7020220, Mailed Date: Feb. 10, 2014, Filed Date: Mar. 31, 2008, 17 Pages (with English Translation).

* cited by examiner

EMULATION OF ROOM LOCK AND LOBBY FEATURE IN DISTRIBUTED CONFERENCING SYSTEM

BACKGROUND

Technological advances in computing devices and networking continue to provide greater access to a wide variety of information and services allowing access from virtually anywhere in the world. Virtual offices are becoming more commonplace since the work that needs to be done can be performed from most locations. Businesses recognize the importance of meetings to effectively address customer needs and to move product development forward, for example. However, bringing users together to conduct business from the many remote locations at which the user could be and supporting the many available communications devices and media types remains a challenging prospect.

Conferencing can be an effective means by which employees of a corporate enterprise, for example, can conduct meetings. However, given the location and connection capabilities at any point in time, participants may want to join via different media types. With the advances in storage and computing power of portable wireless computing devices, users now are capable of interacting with many types of disparate data types such as images, video clips, audio data, and textual data, for example. This is facilitated by several types of devices that users can now employ and with which to connect to the session. For example, one user can participate by audio/video from a conference room, another by voice via a desktop computer, and yet another by text input using a cell phone.

Conventional conferencing systems typically employ a participant passcode and a leader passcode as one way of managing session access and the session, in general. However, these techniques are limited at least insofar as the way in which access and lack of session participant identification is concerned.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture introduces a session lock and lobby feature in a distributed conferencing framework for a conference session. Under the lock scenario, once a user enters the session, the session can be locked to prevent other individuals from entering, even if the individuals were invited to the session. Locking can be accomplished manually by an existing session participant (e.g., a session leader) and/or automatically based on criteria (e.g., session start time).

The lobby feature allows a session participant to become aware of users who may have been locked out by providing notification and/or identification of the user(s) attempting to gain access to the session. In other words, a session leader or presenter (other session participant) can be notified that User A and User B have or are attempting to gain access to the session, but are locked out and standing by in a lobby mode or state. The session leader can then selectively allow access to the session. For example, User A can be allowed session access, while User B is not. In accordance with typical lobby scenarios, however, User B could be scheduled for access at a later time (e.g., 15 minutes later) either automatically or manually.

The architecture facilitates the lock and lobby features in multiple identical, leaderless, conference servers which together form a distributed conferencing system. Session initiation protocol (SIP) and the centralized conference control protocol (C3P or CCCP) can be employed, for example, to facilitate the lock and/or lobby functionality. The SIP implementation addresses shortcomings in the currently addressed Internet drafts, especially for support of a multiple front-end architecture.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
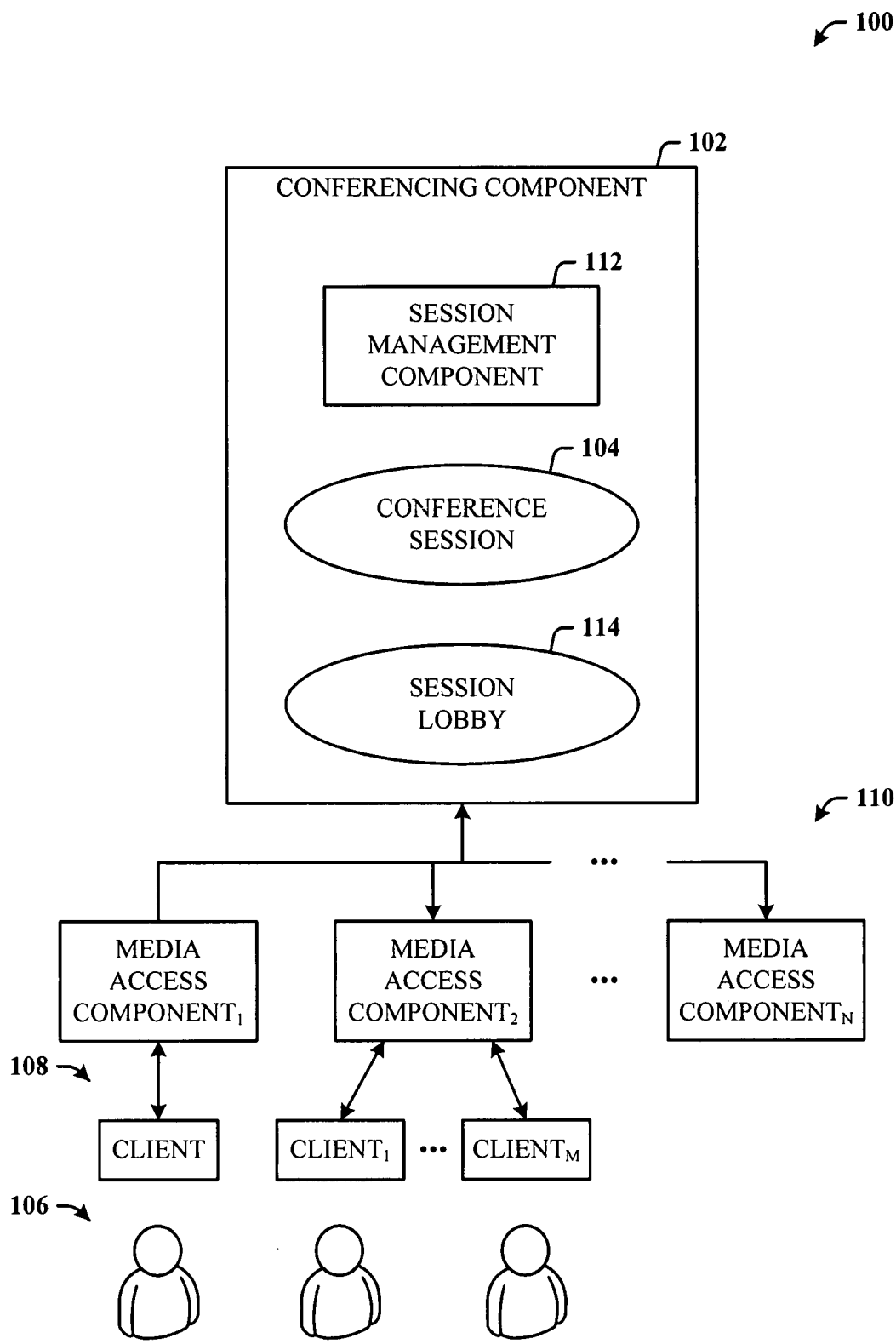
FIG. 1 illustrates a computer-implemented conferencing management system.

The disclosed architecture supports an on-premise conferencing system that can facilitate virtual web meetings. In an actual physical-world analogy, when a meeting occurs in a conference room, the meeting leader (or presenter) can decide to lock the room door to prevent others from entering the meeting, without or without prior permission. When the room is locked, would-be session participants can knock on the door, at which time the session leader can decide whether to allow or deny access to the user. The location from which the would-be participants notify the session leader can be referred to as a lobby, or just outside the conference room. When the conference is set in a locked state no users are admitted into the conference. Moreover, it is possible to also lock out users for gaining access to the lobby. Continuing with the physical analogy, the new users can either be allowed into a lobby or can be denied access to the conference altogether by denying access to the lobby.

In the virtual example of the subject architecture, when the lobby feature is enabled, would-be participants to the session can enter the meeting (or virtual) lobby, and wait for the session leader (or any session participant) to grant session access. If the session leader had not already been in the session, once the leader enters the meeting, the leader can be notified that the would-be participants are waiting in the lobby. The leader can then selectively grant/deny access to each of the lobby users.

The leader can also be notified of the would-be participants in the lobby through console alerts or messages, for example, while the meeting is in progress. The leader can then lock the session "door" to prevent further interruptions. As a means for more specific control, the leader (or presenter) can enable or disable the lobby for each individual meeting. Once granted access, the console for the lobby participant automatically launches and the lobby (or would-be) participant is granted access to all session communications. A participant denied access or that may timeout, can be presented with an appropriate message.

The conferencing architecture is a scalable, pluggable architecture for multi-party, multimedia conferencing. The lock and lobby functionality is provided via centralized policy and control component (the conferencing component) that allows the seamless plug-in of different distributed media access components. The conferencing architecture supports multiple pluggable distributed media components for disparate media types (e.g., data, audio/video, instant messaging) for client participation in the session.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented conferencing management system 100. The system 100 includes a conferencing component 102 for establishing a conferencing session 104 of session participants and would-be participants 106. The participants 106 connect to the conferencing session 104 using clients (or client devices) 108 via distributed media access components 110 (denoted MEDIA ACCESS COMPONENT$_1$, . . . , MEDIA ACCESS COMPONENT$_N$, where N is a positive integer) and based on a session protocol.

The media components 110 can be located anywhere on a network (e.g., the Internet) thereby allowing access via HTTP, for example. The conferencing component 102 can be one of many such components of a network, working separately or cooperatively to provide the session 104, and which do not need to know anything about the other media access components. The media access components 110 include capabilities for connecting with clients that communicate data, audio/video media, audio only, instant messaging, and other media types, combinations, and formats.

A session management component 112 provides for managing access to the conferencing session 104 of allowed session and would-be session participants relative to a session lobby 114. In other words, users desiring to be part of the session 104 can be processed though the lobby 114, or initially, directly into the session 104. Later would-be participants can then be processed through the session lobby 114.

The clients (or client devices) 108 can communicate to the appropriate media access component 110 using a media session protocol, which can be session initiation protocol (SIP) and/or centralized conference control protocol (C3P). The session management component 112 facilitates notification of one of the session participants of the would-be session participant when the would-be session participant is associated with the session lobby 114. One or more of the session participants (e.g., presenter or watcher) can allow or deny access to the session 104 of the would-be session participant from the lobby 114.

As part of the connection process, the would-be session participant can be authenticated by the conferencing component 102 prior to association with the session lobby 114. In support thereof, the conferencing component 102 signals the corresponding distributed media access component(s) 110 associated with the would-be session participant to allow or deny access to the conferencing session 104 by the would-be session participant, based on respective successful or unsuccessful authentication.

For example, in order to meet a conferencing need, one or more of the users 106 accesses the centralized conferencing component 102 (e.g., via an Internet connection) to request that the conference session 104 be created, scheduled, or for participation in a current session. The media access components 110 include the capability to connect and allocate the appropriate media interface (e.g., audio, video, data) for the clients 108 (or client device) being used by the users 106, to configure the media interface to meet the requested client media type, provide session management of the conference session 104 and, manage closeout and cleanup of the session 104 for all associated clients 108 and systems.

The centralized conferencing component 102 can be one of many such components in a network or enterprise, for example, and which also provides scheduling services and creation of the session instance(s). The conferencing component 102 also includes functionality for allocating one or more of the most available distributed media access components 110 for the conference session 104. The conferencing component 102 also functions as a conference policy and roster control service. The conference policy is the overall set of rules governing operation of the conference, and can be broken down into membership policy and media policy. A conference policy service is a logical function which can store and manipulate the conference policy and rosters.

The conferencing component 102 also includes a conference notification service which is a logical function that allows for notification, accepting subscriptions to the conference state, and notifying subscribers about changes to that state. The conference control component also functions to provide session security via user authorization and/or authentication services based on authentication information such as identity information, enterprise credentials, and/or a PIN.

The conferencing controller 102 also interfaces to the distributed media access components 110 for conference policy and roster management services. The conferencing architecture provides conference participants or would-be participants with a single conference picture using a single integrated roster.

It is to be understood that although the disclosed lock and lobby implementation is described in the context of a conferencing system, the general technology can be applied to other contexts where multiple users seek access to a common location or space. For example, the lock and lobby architecture can be applied to virtual online gaming where many users access a central virtual playing field or environment. Given that in these scenarios where public access can fill the available slots for the game, the lobby can be employed to selectively allow certain players in and to prevent other players from access to the virtual environment. Accordingly, this provides more control over player access as well as notification by the current players, rather than a server administrator needing to access a special console to bump players off the server.

Figure 2:
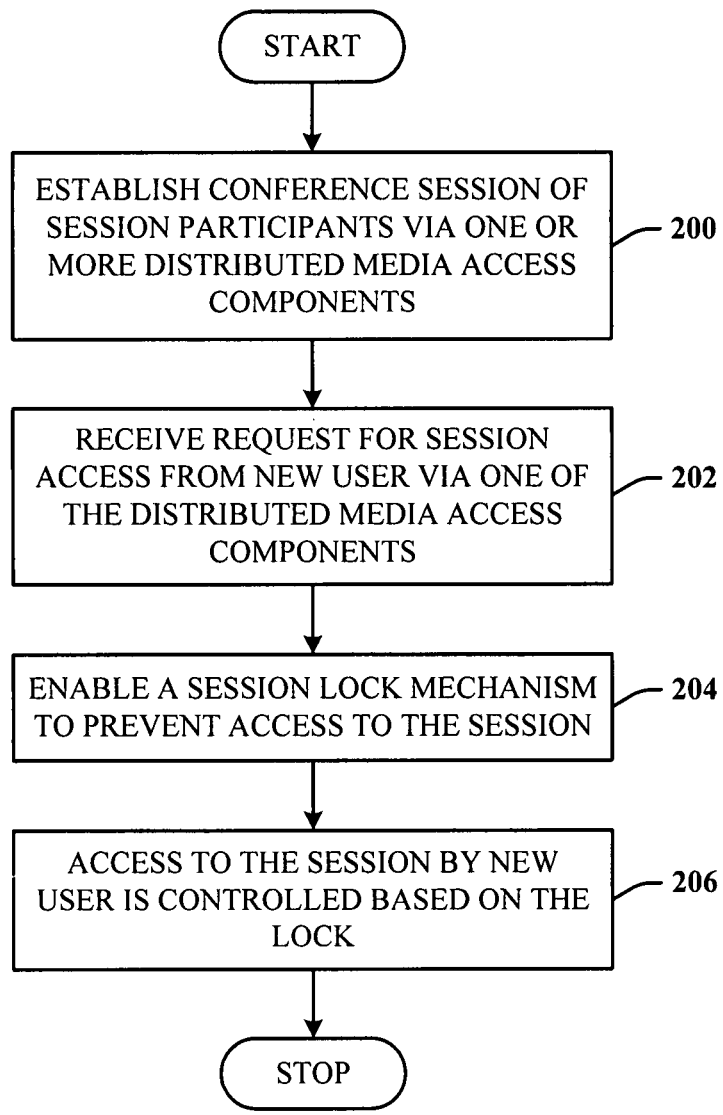
FIG. 2 illustrates a method of managing a conferencing session.

FIG. 2 illustrates a method of managing a conferencing session. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 200, a conference session of session participants is established via one or more of the distributed media access components. At 202, a request for session access is received from a new user, the request received from one of the distributed media access components. At 204, a session lock is enabled to control access to the session, by preventing access to the session. At 206, access to the session for the new user is controlled based on the lock.

Figure 3A:
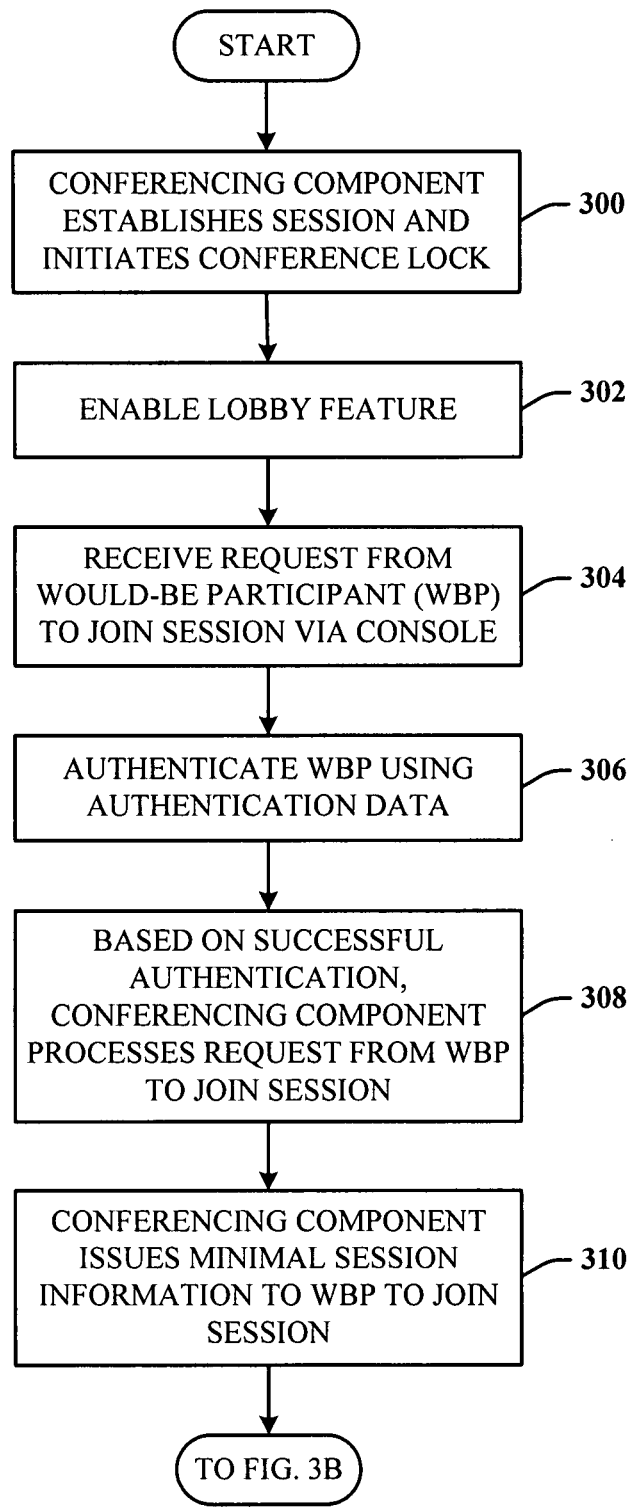
FIG. 3A and FIG. 3B illustrate a more detailed method of managing a conferencing session.
Figure 3B:
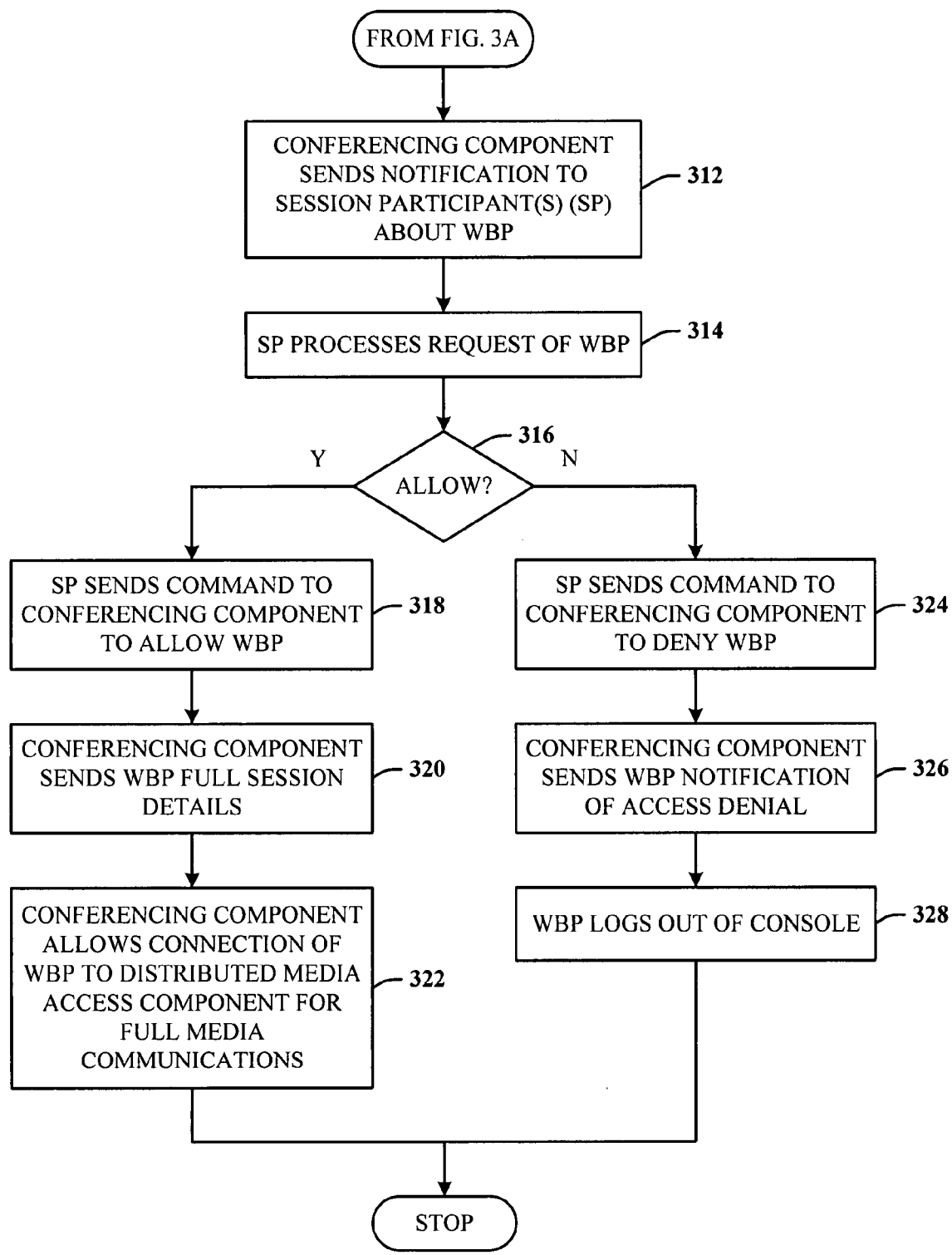

FIG. 3A and FIG. 3B illustrate a more detailed method of managing a conferencing session. At 300, the conferencing component establishes a session and initiates a conference lock to prevent other users or would-be participants from entering the session. At 302, one of the session participants enables the lobby feature. At 304, a request is received from a would-be participant (WBP) to join the session via a console interface (e.g., HTTP). The request can be processed from the user client (or client device) to the corresponding media access component, and then to the conference component. The request can be in the form of a join INVITE. At 306, an authentication process is initiated to authenticate the WBP using authentication data. The data can include enterprise credentials, and/or user information, for example. Based on successful authentication, the conferencing component processes the request from the WBP to join the session, as indicated at 308. At 310, the conferencing component issues minimal session information to the WBP to join the session. The session information can be obtained based on a SUBSCRIBE message to the conference information.

Moving to FIG. 3B, at 312, the conferencing component sends a notification to one or more session participants about the WBP. At 314, a session participant processes the request. At 316, the system checks to determined if the WBP is to be allowed. If so, at 318, the session participant sends a command to the conferencing component to allow the WBP. At 320, the conferencing component sends the WBP full session details. This can include session participants, session leader, if any, current session state (e.g., topic), and so on. At 322, the conferencing component allows connection of the WBP to the distributed media access component for full media communications from the WBP device (e.g., cell phone, portable computer). Alternatively, if WBP access is not allowed, flow is from 316 to 324 where a session participant sends a command to the conferencing component to deny the WBP. The command can be sent using C3P. At 326, the conferencing component sends the WBP notification of access denial. The WBP can send a BYE on join INVITE dialog and NOTIFY (exp:0) on the SUBSCRIBE dialog with he appropriate and phrase. At 328, the WBP logs out of the console.

In a more specific context, a WBP that wants to join the meeting session, accesses a join URL via a console interface. The WBP can be authenticated using domain credentials or a PIN-based digest mechanism, for example. The WBP sends a join INVITE, which join INVITE is accepted and marks the WBP state as pending/on-hold in the lobby. The WBP sends a SUBSCRIBE to the conferencing package. Since the WBP is in an on-hold state, the WBP receives a document which has includes a minimum amount of conference details and information stating the WBP is in a pending/on-hold state.

The conferencing component sends a notification to all the session participants (or watchers) of the session about the pending/on-hold WBP in the session lobby. One or more session leaders (or presenters) who receive the notification of pending/on-hold WBPs in the lobby can decide to deny or allow access to one or more of the WBPs to join the session. A presenter sends a C3P request to the conferencing component to allow/deny the WBP into the conference session. If the presenter allows the WBP, the WBP is changed from pending to the allowed state, and the WBP is sent a conference state full notification with all the details. Alternatively, if the presenter denies the WBP, the WBP is a sent a BYE on join INVITE dialog and NOTIFY (exp:0) on the SUBSCRIBE dialog with appropriate reason phrase. This can be C3P using SIP, for example.

An alternative communications dialog utilizes provisional responses. For example, when the conferencing component receives an INVITE from the WBP and the conference is in a locked state, the presenter (or session participant) can approve this new participant. In that case, the INVITE message can be parked on the conferencing component, and provisional responses can be sent to indicate progress. A notification, using the conferencing component notification service, can then be sent to the presenter. The presenter can then allow the WBP to join, in response to which the conferencing component then accepts the INVITE.

The call flow follows that of FIGS. 3A and 3B, except that the SUBSCRIBE dialog is not established until the participant is authorized. Additionally, the INVITE dialog is on hold and not established until authorized.

Figure 4:
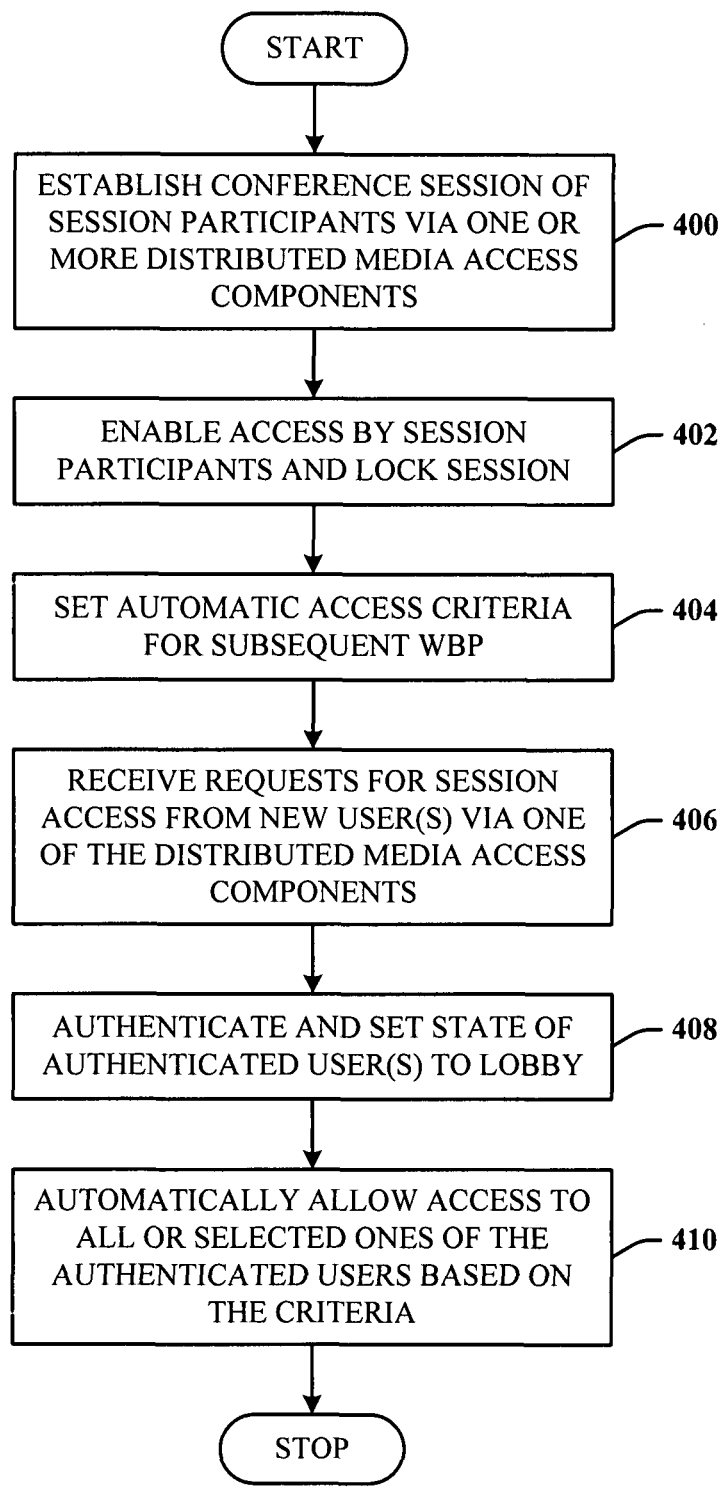
FIG. 4 illustrates a method automatically allowing session access according to predetermined criteria.

FIG. 4 illustrates a method automatically allowing session access according to predetermined criteria. At 400, a conference session is established for session participants via one or more distributed media access components. At 402, access to the session is enabled for the session participants and then session is then locked to prevent further session access. At 404, criteria can be determined and configured for automatically allowing access for all or selected WBPs. At 406, one or more requests for session access are received from WBPs (or new users) via the distributed media access components. At 408, the WBPs are authenticated, and the state for the successfully authenticated users is set to lobby. At 410, access for the lobby WBPs is automatically allowed based on the criteria.

Following is sample code for a notification to a would-be participant that the participant is in an on-hold state in the session lobby.

```
<!-- A participant sip:user1@rtcdev.nttest.mic.com receiving
initial notification from the focus that he is the lobby on-
hold. -->
  <conference-info
entity="sip:conf_4.pool@confdomain.com;user=ms-conf"
state="full" version="0">
    <conference-description>
    <display-text>conf-name</display-text>
    </conference-description>
    <users>
    <user entity="sip:user1@rtcdev.nttest.mic.com" state="full">
    <endpoint entity="sip:user1@rtcdev.nttest.microsoft.com" >
    <status>on-hold</status>
    </endpoint>
    </user>
    </users>
  </conference-info>
```

Following is sample code for a C3P command to allow a would-be participant access from the session lobby.

```
<request requestId="2" from="sip:presenter" to="sip:confuri">
    <setUserAccess>
        <userKeys confEntity="sip:confuri"
         userEntity="sip:user1"/>
        <access>granted</access>
    </setUserAccess>
</request>
```

Following is sample code for a C3P command to deny a would-be participant access from the session lobby.

```
<request requestId="2" from="sip:presenter" to="sip:confuri">
    <setUserAccess>
        <userKeys confEntity="sip:confuri"
         userEntity="sip:user1"/>
        <access>denied</access>
    </setUserAccess>
</request>
```

C3P commands can be utilized to lock and unlock the conference session. The command can be executed conferencing component as well as forked to all media access components.

The state of the conference in the conferencing component and the media access components can be properly conveyed in a conference state document. Following is sample code for locked state in a conference-state element.

```
<conference-info entity="sip:confuri">
    <conference-state>
        <locked>false</locked>
    </conference-state>
<conference-info>
```

This can be used to represent the view of the conference and also to enable each media access component to represent the lock state of the conference session. As the conference-view element is what the media access component uses to publish its state of the conference this can be extended to represent the lock state as well.

```
<conference-view .. >
    <entity-view entity="AV">
        <entity-state>
            <locked>false</locked>
        </entity-state>
    </entity-view>
    <entity-view entity="Data">
        <entity-state>
            <locked>false</locked>
        </entity-state>
    </entity-view>
</conference-view>
```

The focus also can have an entry in the conference-view element. Consider an end-to-end call flow for the lock command based on two media access components: one an audio/video unit and the other a data unit, where initially, the conference is in unlocked state.

The initial conference state can be represented in code as,

```
<conference-info entity="sip:confuri">
    <conference-view .. >
```

```
        <entity-view entity="Focus">
            <entity-state>
                <locked>false</locked>
            </entity-state>
        </entity-view>
        <entity-view entity="AV">
            <entity-state>
                <locked>false</locked>
            </entity-state>
        </entity-view>
        <entity-view entity="Data">
            <entity-state>
                <locked>false</locked>
            </entity-state>
        </entity-view>
    </conference-view>
    <users>
        ...
    </users>
</conference-info>
```

When the session presenter issues a lock conference command, a C3P command is issued to lock the conference, using the following exemplary code.

```
<request requestId="3" from="sip:presenter" to="sip:confuri">
    <modifyConferenceLock>
        <conferenceKeys confEntity="sip:confuri"/>
        <locked>true</locked>
    </modifyConferenceLock>
</request>
```

The conference state after the command is executed on the focus can look as follows, showing the changed value from false (in strike-out) to true.

```
<conference-info entity="sip:confuri">
    <conference-view .. >
        <entity-view entity="Focus">
            <entity-state>
                <locked>~~false~~ true</locked>
            </entity-state>
        </entity-view>
        <entity-view entity="AV">
            <entity-state>
                <locked>false</locked>
            </entity-state>
        </entity-view>
        <entity-view entity="Data">
            <entity-state>
                <locked>false</locked>
            </entity-state>
        </entity-view>
    </conference-view>
    <users>
        ...
    </users>
</conference-info>
```

The conference state after the command is executed on the audio/video media access component can be presented as follows, showing the changed value from false (in strike-out) to true.

```
<conference-info entity="sip:confuri">
    <conference-view .. >
        <entity-view entity="Focus">
            <entity-state>
                <locked>true</locked>
            </entity-state>
```

```
            </entity-view>
            <entity-view entity="AV">
                <entity-state>
                    <locked>false true</locked>
                </entity-state>
            </entity-view>
            <entity-view entity="Data">
                <entity-state>
                    <locked>false</locked>
                </entity-state>
            </entity-view>
        </conference-view>
        <users>
            ...
        </users>
    </conference-info>
```

The conference state after the command is executed on the data media access component, which is also the final state, can be represented as follows, showing the changed value from false (in strike-out) to true.

```
<conference-info entity="sip:confuri">
    <conference-view .. >
        <entity-view entity="Focus">
            <entity-state>
                <locked>true</locked>
            </entity-state>
        </entity-view>
        <entity-view entity="AV">
            <entity-state>
                <lockedtrue</locked>
            </entity-state>
        </entity-view>
        <entity-view entity="Data">
            <entity-state>
                <locked>false true</locked>
            </entity-state>
        </entity-view>
    </conference-view>
    <users>
        ...
    </users>
</conference-info>
```

The presenter then issues a unlock conference command. The command can be a C3P command to unlock the conference, and which can be represented by the following code.

```
<request requestId="3" from="sip:presenter"
    to="sip:confuri">
    <modifyConferenceLock>
        <conferenceKeys confEntity="sip:confuri"/>
        <locked>false</locked>
    </modifyConferenceLock>
</request>
```

The conference state after the command is executed on the conferencing component and all the media access components can be represented by the following code, showing the changed values from true (in strike-out) to false.

```
<conference-info entity="sip:confuri">
    <conference-view .. >
        <entity-view entity="Focus">
            <entity-state>
                <locked>true false</locked>
            </entity-state>
        </entity-view>
        <entity-view entity="AV">
            <entity-state>
                <locked>true false</locked>
            </entity-state>
        </entity-view>
        <entity-view entity="Data">
            <entity-state>
                <locked>true false</locked>
            </entity-state>
        </entity-view>
    </conference-view>
    <users>
        ...
    </users>
</conference-info>
```

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 5:
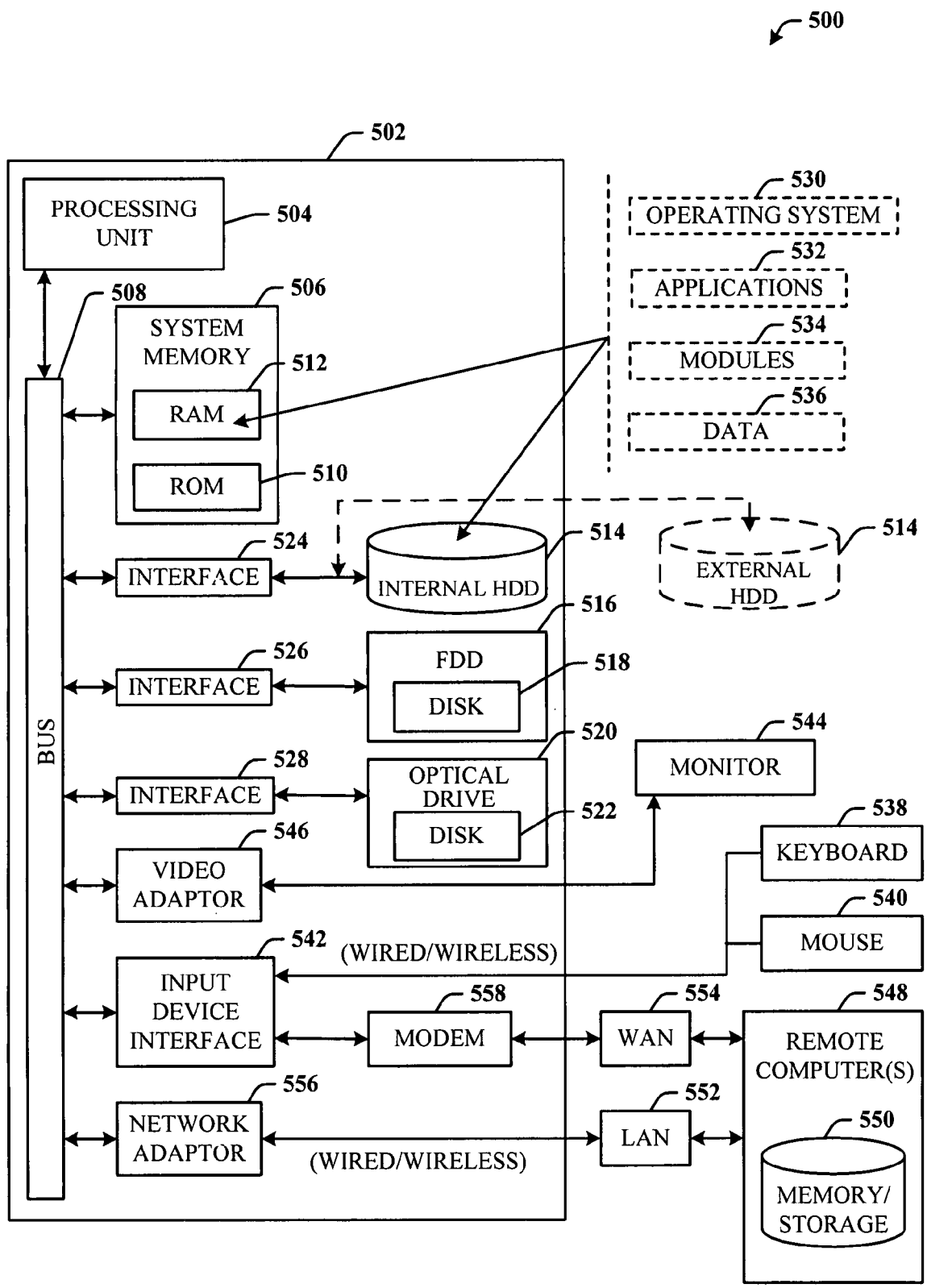
FIG. 5 illustrates a block diagram of a computing system operable to execute the lock and lobby protocol architecture in accordance with the disclosed architecture.

Referring now to FIG. 5, there is illustrated a block diagram of a computing system 500 operable to execute the lock and lobby protocol architecture in accordance with the disclosed architecture. In order to provide additional context for various aspects thereof, FIG. 5 and the following discussion are intended to provide a brief, general description of a suitable computing system 500 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 5, the exemplary computing system 500 for implementing various aspects includes a computer 502, the computer 502 including a processing unit 504, a system memory 506 and a system bus 508. The system bus 508 provides an interface for system components including, but not limited to, the system memory 506 to the processing unit 504. The processing unit 504 can be any of various commercially available processors. Dual microprocessors and other multi-processor architectures may also be employed as the processing unit 504.

The system bus 508 can be any of several types of bus structure that may further interconnect to a memory bus (with or without a memory controller), a peripheral bus, and a local bus using any of a variety of commercially available bus architectures. The system memory 506 includes read-only memory (ROM) 510 and random access memory (RAM) 512. A basic input/output system (BIOS) is stored in a non-volatile memory 510 such as ROM, EPROM, EEPROM, which BIOS contains the basic routines that help to transfer information between elements within the computer 502, such as during start-up. The RAM 512 can also include a high-speed RAM such as static RAM for caching data.

The computer 502 further includes an internal hard disk drive (HDD) 514 (e.g., EIDE, SATA), which internal hard disk drive 514 may also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The hard disk drive 514, magnetic disk drive 516 and optical disk drive 520 can be connected to the system bus 508 by a hard disk drive interface 524, a magnetic disk drive interface 526 and an optical drive interface 528, respectively. The interface 524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 512, including an operating system 530, one or more application programs 532, other program modules 534 and program data 536. The one or more application programs 532 and other program modules 534 can include the clients 108, media access components 110, and conferencing component 102, for example.

All or portions of the operating system, applications, modules, and/or data can also be cached in the RAM 512. It is to be appreciated that the disclosed architecture can be implemented with various commercially available operating systems or combinations of operating systems.

A user can enter commands and information into the computer 502 through one or more wire/wireless input devices, for example, a keyboard 538 and a pointing device, such as a mouse 540. Other input devices (not shown) may include a microphone, an IR remote control, a joystick, a game pad, a stylus pen, touch screen, or the like. These and other input devices are often connected to the processing unit 504 through an input device interface 542 that is coupled to the system bus 508, but can be connected by other interfaces, such as a parallel port, an IEEE 1394 serial port, a game port, a USB port, an IR interface, etc.

A monitor 544 or other type of display device is also connected to the system bus 508 via an interface, such as a video adapter 546. In addition to the monitor 544, a computer typically includes other peripheral output devices (not shown), such as speakers, printers, etc.

The computer 502 may operate in a networked environment using logical connections via wire and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the local network 552 through a wire and/or wireless communication network interface or adapter 556. The adaptor 556 may facilitate wire or wireless communication to the LAN 552, which may also include a wireless access point disposed thereon for communicating with the wireless adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, is connected to the system bus 508 via the serial port interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 6:
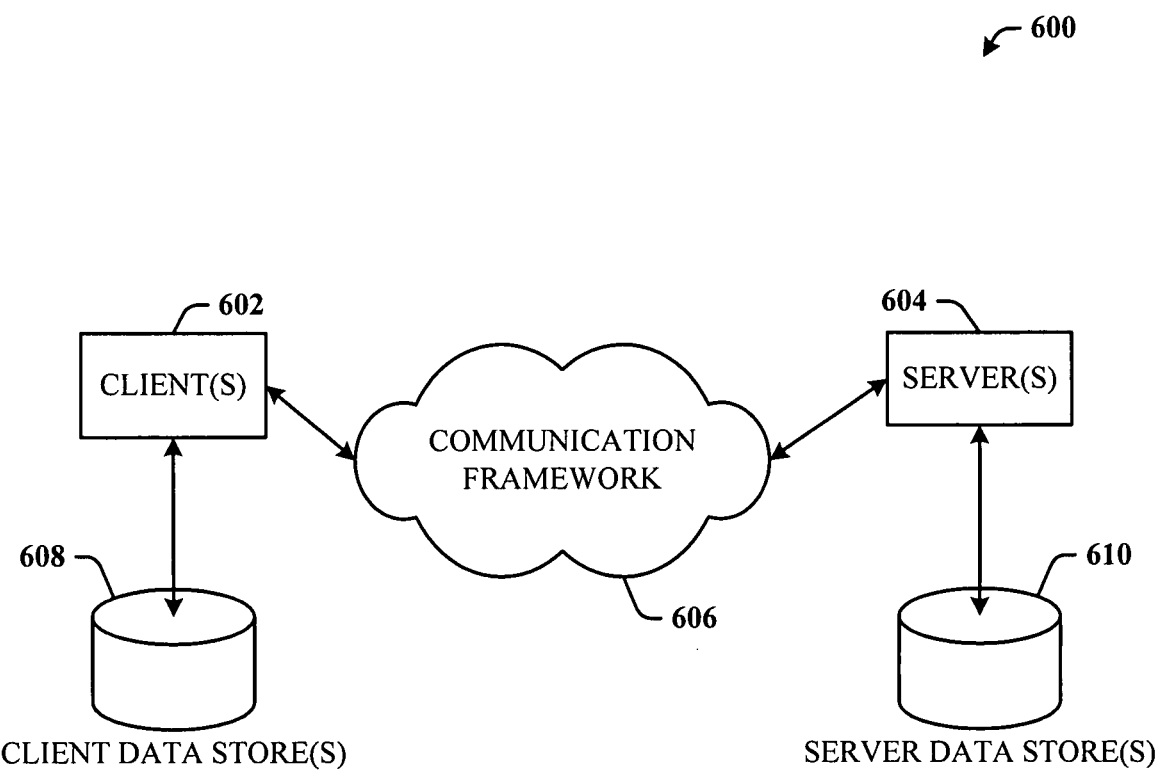
FIG. 6 illustrates a schematic block diagram of an exemplary computing environment for the lock and lobby protocol architecture.

Referring now to FIG. 6, there is illustrated a schematic block diagram of an exemplary computing environment 600 for the lock and lobby protocol architecture. The system 600 includes one or more client(s) 602. The client(s) 602 can be hardware and/or software (e.g., threads, processes, computing devices). The client(s) 602 can house cookie(s) and/or associated contextual information, for example.

The system 600 also includes one or more server(s) 604. The server(s) 604 can also be hardware and/or software (e.g., threads, processes, computing devices). The servers 604 can house threads to perform transformations by employing the architecture, for example. One possible communication between a client 602 and a server 604 can be in the form of a data packet adapted to be transmitted between two or more computer processes. The data packet may include a cookie and/or associated contextual information, for example. The system 600 includes a communication framework 606 (e.g., a global communication network such as the Internet) that can be employed to facilitate communications between the client(s) 602 and the server(s) 604.

Communications can be facilitated via a wired (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604. The clients 602 can include the clients 108 of FIG. 1 and, the media access components 110 and conferencing component 102 can be part of the servers 604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented conferencing management system, comprising:
    a processor;
    a memory communicatively coupled to the processor, the memory having computer-executable instructions that when executed by the processor, provide one or more components, the one or more components further comprising:
    a conferencing component for establishing a conferencing session of session participants, the session participants connected to the conferencing session via distributed media access components and based on a session protocol, wherein the conferencing component is further configured to receive a first join request from a first would-be session participant, the first join request including criteria that the first would-be session participant should be automatically admitted to the conferencing session, wherein upon receipt of the criteria in the first join request the first would-be session participant is admitted to the conference as a non-moderator session participant, and wherein the conferencing component is further configured to receive a second join request from a second would-be session participant, the second join request not including the criteria that the second would-be session participant should be automatically admitted to the conferencing session, wherein upon receipt of the second join request not including the criteria the second would-be session participant is admitted to a session lobby, and wherein the conferencing component is further configured to notify the non-moderator session participant of the second join request received by the conferencing component; and
    a session management component for managing access to the conferencing session of the second would-be session participant relative to the session lobby, wherein the session management component is further configured to receive a notification from the session participant to promote the second would-be session participant from the session lobby to the conferencing session, wherein the session management component is further configured to receive a notification from the non-moderator session participant to enable a session lock to prevent further access and requests for access to the conferencing session.

2. The system of claim 1, wherein the session protocol is session initiation protocol (SIP).

3. The system of claim 1, wherein the session protocol is centralized conference control protocol (C3P).

4. The system of claim 1, wherein the session management component facilitates notification of the non-moderator session participant of the second would-be session participant when the second would-be session participant is associated with the session lobby.

5. The system of claim 4, wherein the conferencing component is further configured to receive an indication from the non-moderator session participant denying access to the conferencing session for the second would-be session participant.

6. The system of claim 4, wherein the conferencing component is further configured to receive an indication from the non-moderator session participant allowing access to the conferencing session for the second would-be session participant.

7. The system of claim 1, wherein the second would-be session participant is authenticated by the conferencing component prior to association with the session lobby.

8. The system of claim 7, wherein the conferencing component signals one of the distributed media access components associated with the second would-be session participant to deny access to the conferencing session by the second would-be session participant, based on an unsuccessful authentication.

9. The system of claim 7, wherein the conferencing component signals one of the distributed media access components associated with the second would-be session participant to allow access to the conferencing session to the second would-be session participant, based on a successful authentication.

10. A computer-implemented method of managing a conferencing session, comprising:
- establishing a conferencing session of session participants via distributed media access components;
- receiving a first request for session access from a first new user via one of the distributed media access components;
- determining that the first request includes criteria that the first new user should be automatically admitted to the conferencing session;
- admitting the first new user to the conferencing session as a non-moderator session participant;
- receiving a second request for session access from a second new user via another of the distributed media access components;
- determining that the second request does not include criteria that the second new user should be automatically admitted to the conferencing session;
- notifying the non-moderator session participant that the second request for session access was received from the second new user;
- receiving a notification from the non-moderator session participant to promote the second new user to the conferencing session;
- admitting the second new user to the conferencing session;
- enabling a session lock to prevent further access and requests for access to the conferencing session by the second new user; and
- controlling access to the conferencing session by the second new user based on the session lock.

11. The method of claim 10, further comprising controlling access to the conferencing session by the first new user and the second new user via at least one of SIP or C3P.

12. The method of claim 10, further comprising authenticating the first new user and the second new user via the one of the distributed media access components using enterprise credentials.

13. The method of claim 10, further comprising authenticating the first new user and the second new user via the one of the distributed media access components using digest data.

14. The method of claim 10, further comprising sending a lesser amount of session information to the second new user based on initiation of an authentication process.

15. The method of claim 10, further comprising sending a greater amount of session information to the second new user based on successful authentication of the second new user.

16. The method of claim 10, further comprising notifying the session participants during the conferencing session of the request of the second new user.

17. The method of claim 10, further comprising allowing a full media stream from the one of the distributed media access components based on session access by the second new user, the access granted by the non-moderator session participants.

18. The method of claim 10, further comprising notifying a subset of the session participants that the second new user is attempting to gain access to the conferencing session, and granting access to the session based on the subset.

19. The method of claim 10, further comprising managing existence of a lobby feature for the conferencing session.

* * * * *